United States Patent Office 3,394,607
Patented July 30, 1968

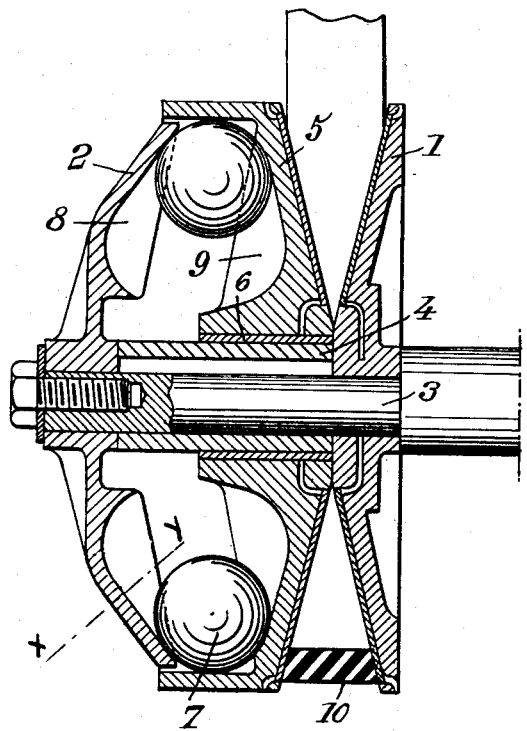

3,394,607
TRANSMISSION MECHANISM HAVING VARIABLE TRANSMISSION RATIOS
Henry Hubert, Somme, France, assignor to North American Philips Company, Inc., New York, N.Y., a corporation of Delaware
Filed Apr. 5, 1966, Ser. No. 540,235
Claims priority, application France, Apr. 7, 1965, 12,294
3 Claims. (Cl. 74—230.17)

ABSTRACT OF THE DISCLOSURE

A variable transmission ratio mechanism with a movable disc having a curvilinear race surface for a ball, the radius of curvature of the race being substantially equal to the radius of curvature of the corresponding ball in the race.

---

The invention relates to a transmission mechanism having a variable transmission ratio (for example, for driving a domestic clothes washer having a washing and a spinning speed), which mechanism comprises a pulley on a driving shaft which consists of a conical disc keyed to said shaft and a conical disc which is movable in the direction of the centre lines of the shaft, the shaft having rigidly secured to it a second disc between which second disc and the movable disc a number of balls are arranged which, an acceleration of the driving shaft, move outwards thereby displacing the movable disc and thus varying the effective diameter of the pulley.

A problem in the construction of mechanisms of the said type is that it has to be prevented that the displacement of the balls produces grooves in the surfaces of the discs, which would result in the pulley being worn out rapidly. One of the proposed solutions consists in guiding the balls in such manner that their ball track is different for every displacement. However, this solution necessitates the provision of an additional member which increases the cost price of the assembly.

The present invention mitigates the above-mentioned drawbacks without this requiring a costly mechanical solution. The invention is characterized in that one of the sides facing one another of the second disc and the movable disc is provided with cylindrical grooves in each of which one of the balls can run, the radius of curvature of which measured in a plane at right angles to the surface of the disc throughout the length of the grooves being equal to or substantially equal to that of the ball running in the groove in question.

The mechanism according to the invention is even further improved if also the second of the two said sides facing one another is provided with grooves of the said shape.

A preferred embodiment is characterized in that the grooves are limited at least at one of their ends by spherical parts the radius of which is equal to or substantially equal to that of the ball running in the groove in question.

In order that the invention may readily be carried into effect, it will now be described in greater detail, by way of example, with reference to the accompanying drawing which shows the movable pulley of a mechanism according to the invention in the position in which the effective diameter is at a maximum.

The discs 1 and 2 are rigidly secured to the driving shaft 3 which may be the shaft of a driving motor. The shaft 3 has likewise rigidly secured to it a sleeve 4 on which the disc 5 with its bearing 6 can move freely in the axial direction under the influence of balls 7 which move in cylindrical grooves 8 and 9 provided in the discs 2 and 5 respectively. The said pulley is coupled by the belt 10 to a known second movable pulley not shown of the type comprising a fixed truncated disc and a movable truncated disc capable of moving along the axis under the influence of a spring.

When the driving shaft 3 rotates at a reduced speed, the belt 10 is at the bottom of the score formed by the truncated faces of the discs 1 and 5. When the speed increases the balls 7 move away from the driving shaft 3 under the action of the centrifugal force and produce a resultant force on the movable disc 5 which exceeds the pressure of the spring of the second movable pulley; the disc 5 approaches the disc 1 which produces an increase of the effective diameter of the said pulley and a decrease of the effective diameter of the second pulley.

When the speed of the shaft 3 decreases the resultant force exercised by the balls on the discs 5 is smaller than the pressure of the spring of the second pulley so that the two discs of the latter pulley approach one another; so a separation of the discs 1 and 5 and the return of the balls to their initial position is obtained.

What is claimed is:

1. A transmission mechanism with a variable transmission ratio comprising a drive shaft, a pulley on said drive shaft including a first disc fixed to said drive shaft and a second disc having a curvilinear groove therein at the rear surface thereof movable axially on said drive shaft, a third disc fixed to said drive shaft and having a curvilinear groove located in space-confronting manner with the curvilinear groove in the second disc, a plurality of balls in said curvilinear grooves adapted to move outwardly to thereby displace said second disc and thus vary the effective diameter of said pulley when the rotation of said drive shaft is accelerated, the radius of curvature of at least one of said curvilinear grooves being measured in a plane at right angles to the surface of said disc throughout the length of said groove being substantially equal to the radius of curvature of the corresponding ball in said one groove.

2. A transmission mechanism with a variable transmission ratio as claimed in claim 1 wherein each of said curvilinear grooves located in space confronting manner to each other are provided with a radius of curvature measured in a plane at right angles to the surface of said disc throughout the length of said groove which is substantially equal to the radius of curvature of the corresponding ball therein.

3. A transmission mechanism with a variable transmission ratio as claimed in claim 1 wherein at least one end of one of said grooves is provided with a spherical structure having a radius that is substantially equal to that of the corresponding ball in said groove.

References Cited

FOREIGN PATENTS

| | | |
|---|---|---|
| 485,804 | 8/1952 | Canada. |
| 1,045,919 | 7/1953 | France. |
| 1,121,165 | 4/1956 | France. |
| 1,187,177 | 3/1959 | France. |

C. J. HUSAR, *Primary Examiner.*